United States Patent
Finan et al.

(10) Patent No.: US 10,682,954 B2
(45) Date of Patent: Jun. 16, 2020

(54) REPRODUCTION OF BACKWARD IMAGES OF A COMBINATION

(71) Applicant: Connaught Electronics Ltd., Tuam, County Galway (IE)

(72) Inventors: Brian Finan, Tuam (IE); Alan Hanniffy, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 16/333,805

(22) PCT Filed: Aug. 8, 2017

(86) PCT No.: PCT/EP2017/069993
§ 371 (c)(1),
(2) Date: Mar. 15, 2019

(87) PCT Pub. No.: WO2018/050361
PCT Pub. Date: Mar. 22, 2018

(65) Prior Publication Data
US 2019/0255998 A1 Aug. 22, 2019

(30) Foreign Application Priority Data
Sep. 16, 2016 (DE) .......... 10 2016 117 476

(51) Int. Cl.
*B60R 1/00* (2006.01)
*B60R 1/12* (2006.01)
(Continued)

(52) U.S. Cl.
CPC .......... *B60R 1/00* (2013.01); *B60R 1/12* (2013.01); *H04N 5/247* (2013.01);
(Continued)

(58) Field of Classification Search
CPC ..... B60R 1/00; B60R 2300/105; B60R 11/04; B60R 1/006; B60R 2011/004; B60R 2300/303; H04N 7/181
See application file for complete search history.

(56) References Cited

U.S. PATENT DOCUMENTS 9,227,568 B1   1/2016 Hubbell et al.
2006/0066835 A1 * 3/2006 Laufer ............... B60R 1/00
                                                 356/3

(Continued)

FOREIGN PATENT DOCUMENTS

WO   2015/192987 A1   12/2015
WO   2016/026870 A1   2/2016

OTHER PUBLICATIONS

German Search Report in corresponding German Application No. 10 2016 117 476.9, dated May 30, 2017 (5 pages).
(Continued)

*Primary Examiner* — Obafemi O Sosanya
(74) *Attorney, Agent, or Firm* — Osha Liang LLP

(57) ABSTRACT

The operation of combinations of a vehicle and a trailer is to be rendered safer. For this purpose a method for reproducing images from backward cameras of a combination of a vehicle and a trailer is suggested. A first image (RV) from a first backward camera, which is arranged on the vehicle, and a second image (TR) from a second backward camera are simultaneously reproduced on a display unit in the vehicle. For the reproduction a predeterminable window (F) of the display unit is used in order to represent exclusively the second image (TR) from the second camera of the trailer.

10 Claims, 2 Drawing Sheets

Figure 1:
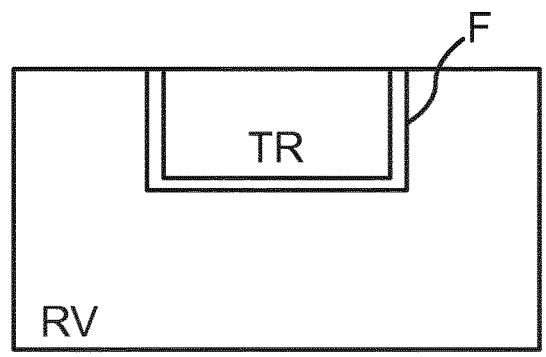

(51) Int. Cl.
*H04N 5/247* (2006.01)
*H04N 5/445* (2011.01)
*H04N 7/18* (2006.01)

(52) U.S. Cl.
CPC .......... *H04N 5/44591* (2013.01); *H04N 7/18* (2013.01); *H04N 7/181* (2013.01); *B60R 2001/1253* (2013.01); *B60R 2300/105* (2013.01); *B60R 2300/303* (2013.01); *B60R 2300/70* (2013.01); *B60R 2300/8066* (2013.01)

(56) References Cited

U.S. PATENT DOCUMENTS

| | | | |
|---|---|---|---|
| 2014/0022389 A1* | 1/2014 | Kageta | B60R 1/00 348/148 |
| 2014/0172892 A1* | 6/2014 | Schechter | G06F 16/9535 707/758 |
| 2017/0123431 A1* | 5/2017 | Ghneim | B60W 10/184 |

OTHER PUBLICATIONS

International Search Report and Written Opinion in corresponding International Application No. PCT/EP2017/069993, dated Sep. 19, 2017 (10 pages).

* cited by examiner

REPRODUCTION OF BACKWARD IMAGES OF A COMBINATION

The present invention relates to a method for reproducing images of backward cameras of a combination of a vehicle and a trailer by capturing a first image by a first backward camera, which is arranged on the vehicle, capturing a second image by a second camera, which is arranged on the trailer, and simultaneous reproduction of the first image and the second image on a display device in the vehicle. Moreover the present invention relates to an imaging system for reproducing images of a combination of a vehicle and a trailer comprising a first camera, which is arrangeable on the vehicle facing backward, for recording a first image by a second camera, which is arrangeable on the trailer facing backward, for capturing a second image, and a display unit for simultaneous reproduction of the first image and the second image in the vehicle. Further, the present invention relates to a vehicle and in particular to a motor vehicle with such an imaging system.

In the case of a combination comprising a vehicle and a trailer the problem exists that for the driver of the vehicle the rear space is only hard to be viewed. By means of the interior mirror and the two exterior mirrors the rear space around the combination can only be viewed in fractions. Thereby difficulties arise not only when moving the combination backwards, but also when changing lanes. The driver namely cannot always recognize whether for instance there is a further vehicle behind his combination or whether for instance diagonally behind his combination or whether for instance diagonally behind the combination on an adjacent lane there is a vehicle driving and a change of lane therefore not possible.

From the document WO 2016/026870 A1 a display system for generating a composite view of an area behind a vehicle pulling a trailer is disclosed. A first camera is envisaged for outputting first image data corresponding to a first image. The first camera can be attached backward facing on the vehicle. Moreover a second camera is envisaged for outputting second image data corresponding to a second image. The second camera can be attached facing backward on the trailer. An image processor receives the first image data and the second image data. The image processor is in a position to combine the first image data and the second image data in order to generate composite image data corresponding to a composite image. By the two superimposed images the driver gains the impression as if he could see through the trailer.

The problem with this known way of combining the backward facing image of a vehicle with the backward facing image of a trailer, however, is that the superimposition strongly depends on the respective light conditions. If a vehicle for instance drives behind the trailer in the shade, the trailer itself, however, in the sun, the superimposed image of the vehicle driving behind the trailer is only relatively low in contrast and thus hardly visible.

The object of the present invention thus consists in making the rear environment of a combination safer for the driver to monitor.

According to the invention this task is solved by a method according to claim 1 as well as an imaging system according to claim 6. Advantageous embodiments of the invention derive from the subclaims.

According to the present invention consequently a method is provided for reproducing images of backward facing cameras of a combination of a vehicle and a trailer. Such a vehicle is for instance a motor vehicle, such as a passenger car or a lorry, and the trailer is for instance a caravan or any other transport trailer. In the case of this method a capturing of the first image is effected by a backward facing first camera (i.e. camera directed in the backward driving direction), which is arranged on the vehicle. This means that by the vehicle itself an image or a video of the rear environment is gained. Equally, a capturing of the second image is effected by a backward facing second camera, which is arranged on the trailer. This means that also from the trailer backward an image or a video of the rear environment of the trailer is gained.

Subsequently, a simultaneous reproduction of the first image and the second image on a display unit in the vehicle is effected. This means the two images are reproduced together on the display unit so that the driver can overview both the rear vehicle space as well as the rear trailer space. In this simultaneous reproduction it is now envisaged in an advantageous way that a predeterminable window of the display unit is used in order to exclusively represent the second image of the second camera of the trailer. This means that a local separation between the reproduced first image and the reproduced second image is effected. Thus no superimposition of the two images of the vehicle camera and the trailer camera takes place. This has the advantage that the two images can be processed independently of each other. In particular the images can be presented without extensive adjustment to each other. Especially, also the reproduction of the second image is entirely unproblematic, even if the image of the trailer captured by the vehicle camera is very bright.

In one embodiment the first camera is a rear camera of the vehicle, and on the display unit in a display area adjacent to the window the first image of this rear camera is represented. This means that the display area of the display unit can also be subdivided into the window and the remaining part of the display area. In the remaining part of the display area accordingly the environment behind the vehicle is represented, whilst in the window the rear environment of the trailer is shown. In this connection the window preferably is to be placed in such a way that it is located where without the window the trailer of the first camera, i.e. the vehicle camera would be displayed. The window of course does not have to cover the entire trailer.

According to a different embodiment variant the first camera is a camera on the left exterior mirror of the vehicle, and on the display unit in a display area adjacent to the window the first image of this camera on the left exterior mirror is represented. Moreover, a third camera is arranged on the right exterior mirror, and on the display unit in a display area adjacent to the window a third image of this third camera on the right exterior mirror is represented. This means that on the display unit on the whole three different images or videos are presented: On the one hand an image from a backward camera of the trailer and on the other hand two images from the two backward exterior mirror cameras. Here, too, it is advantageous if the window placed in such a way that it covers only the portion, in which otherwise the trailer would be represented. In this connection it is a good option to represent the first image from the left exterior mirror camera in the display area on the right side and the image from the right exterior mirror camera in the display area on the left side.

According to a further embodiment of this embodiment just mentioned, in which the first camera is arranged on the left exterior mirror, the second camera in the trailer and the third camera on the right exterior mirror, a fourth camera is arranged in the rear part of the vehicle. On the display unit then in a display region adjacent to the window a fourth image from this fourth camera is represented. This means that on the display unit now the images or videos from four cameras are presented simultaneously. Here, too, the individual images are presented independently of each other each in separate predetermined or predeterminable windows. This means they are not superimposed and do not require extensive image processing.

In a preferred embodiment a dimension of the trailer is determined and subsequently automatically in dependency on the dimensions of the trailer a contour of the window is formed. So, if for instance by the vehicle a large trailer is pulled, the window can be correspondingly large. If, by contrast, a small trailer is pulled by the vehicle, it is advantageous, if the window is smaller so that not all areas are covered by images of other cameras providing valuable information about the environment of the combination.

The above-described task moreover is solved by an imaging system for reproducing images of a combination of a vehicle and a trailer comprising a first camera, which is arrangeable on the vehicle facing backwards, for capturing a first image,
a second camera, which is arrangeable on the vehicle facing backwards, for capturing a second image and
a display unit for simultaneous reproduction of the first image and the second image in the vehicle, wherein
in a display area of the display unit for the reproduction a predeterminable window is provided in order to exclusively represent the second image of the second camera of the trailer.

The advantages set out in connection with the method according to the invention and variation options in analogy also apply to the imaging system according to the invention.

Accordingly the individually indicated method steps can also be taken as functional features of corresponding means of the imaging system.

In an advantageous embodiment of the imaging system in a use position of the display unit the window is arranged in the center at the top. Commonly, the display unit when being used has a vertically extending display plane. The indication "top" refers to this vertical orientation. Regardless of the use position of the display unit, however, each image reproduction can be assigned a "top" and a "bottom", which corresponds to the natural orientation of the captured environment of the combination. In this regard, too, the window can be arranged within the display area in the center at the top. This arrangement has the advantage that at this place of the window typically the trailer itself would be represented. This window in the center at the top can be a starting position for the operation of imaging systems. This position, however, can for instance be dynamically changed, if the position of the trailer is monitored automatically relative to the vehicle. In this way the position of the window can always be shifted to exactly where within the image of the rear vehicle camera the trailer is situated.

In an alternative design of the imaging system in a use position of the display unit the window can be arranged in the display area in the center. This is in particular preferable, if in addition to the image of the trailer in the center also the backward directed images of the two exterior mirror cameras are represented. From the perspective of the exterior mirror cameras the trailer namely typically is situated in the vertical center portion. With reference to a composite image from a left exterior mirror camera and a right exterior mirror camera the trailer also is situated in a horizontal center. Consequently, the result is that the trailer in the case of a composite image from the left exterior mirror camera and the right exterior mirror camera is situated in the center.

According to a further embodiment in a use position of the display unit below the window in the display area one further window each is arranged for an image of the first camera and for an image of a third camera. In this connection the first camera can be the left exterior mirror camera and the third camera can be the right exterior mirror camera. In this case consequently the images of the two exterior mirror cameras are represented below the image of the backward facing trailer camera. In this connection all three windows in the center at the top can be situated in the display area of the display unit. By this arrangement the driver quickly gains an overview of the rear environment.

As has already been indicated in the above, it is particularly advantageous, if a vehicle is equipped with the imaging system according to the invention. In this way a driver of the vehicle benefits from the capturing and representing options of this imaging system.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originaly formulated independent claim. Moreover, implementations and feature combinations are to be considered as disclosed, in particular by the implementations set out above, which extend beyond or deviate from the feature combinations set out in the relations of the claims.

Figure 2:
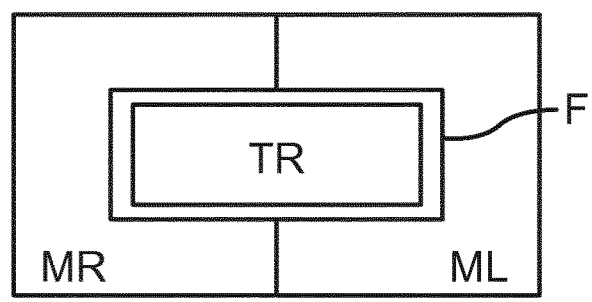
Figure 3:
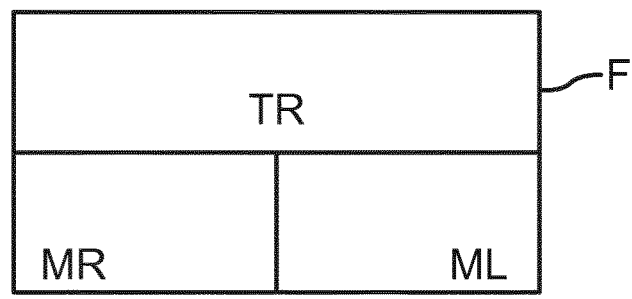
Figure 4:
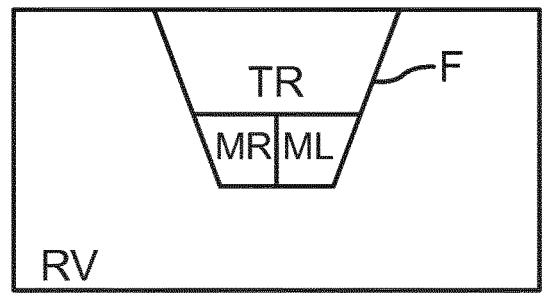
Figure 5:
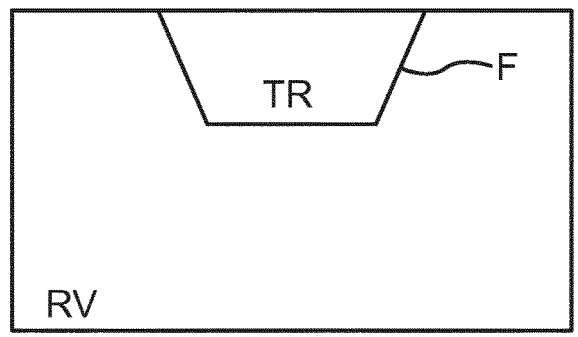
Figure 6:
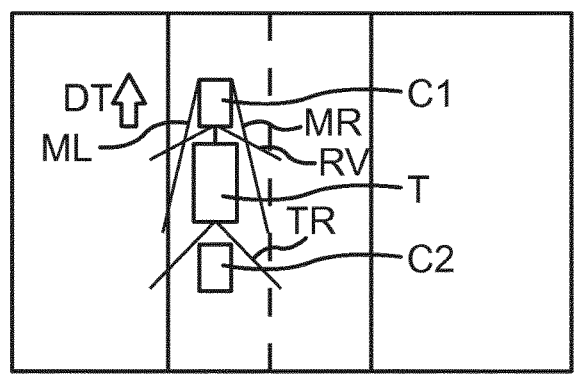

The present invention now is explained in more detail on the basis of the enclosed drawings, in which it is shown in:

FIG. 1 a rear view from a vehicle rear camera combined with a rear view from a trailer camera;

FIG. 2 rear views from exterior mirror cameras combined with a rear view from a trailer camera;

FIG. 3 rear views from exterior mirror cameras combined with a rear view from a trailer camera;

FIG. 4 rear views from exterior mirror cameras combined with a rear view from a rear camera of the vehicle and a rear view from a trailer camera;

FIG. 5 a rear view from a rear camera combined with a rear view from a trailer camera;

FIG. 6 a schematic view of a vehicle behind a combination; and

Figure 7:
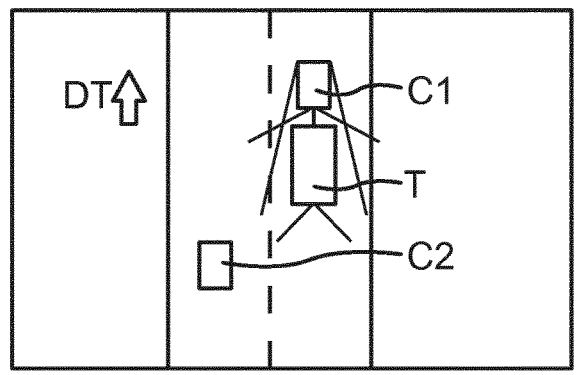

FIG. 7 a schematic view of a vehicle on a different lane diagonally behind the combination.

The embodiments explained in more detail in the following represent preferred embodiments of the present invention.

The present invention is based on the idea of representing several images simultaneously and independently of each other in a display unit and of providing at least one specific window for this purpose, in which the image of one of the cameras is presented. In the remaining part of the display area the display device a further or several further images can be presented.

With the invention a safe system and method for the user or the driver of a vehicle, who wishes to pull or maneuver a trailer is provided. The elimination of a blind spot behind the trailer allows for the driver to avoid collisions with stationary objects. Thus damage to other objects and the trailer as well as collisions with persons (pedestrians, cyclists, playing children etc.) can be avoided. In particular in this way serious injuries with possibly fatal consequences can be avoided.

When driving on public roads the invention allows for a direct viewing of the traffic behind the trailer. This traffic otherwise would not be visible. The consideration of this traffic and its maneuver can be very important to the driver of the combination for instance when changing a lane or when overtaking a vehicle.

In the following some reproduction options of backward cameras in or on the combination are explained. These are merely exemplary embodiments. The display unit comprises for instance a screen with a display area. This display area can logically be subdivided. In the present case in particular in the display area a window is provided in order to represent the image of the backward trailer camera in the window. In the remaining display area an image of a camera in or on the vehicle is presented. In the present document the term "image" is also understood as a substitute for a video.

The used imaging system can envisage that the window in the display area is predetermined fixed in size and position. Alternatively the imaging system can also be configured in such a way that several different images or views of several cameras of the system are presented on the screen in various combinations. Thus for instance the driver can select his personally preferred arrangement of the views on the screen. Possibly the subdivisions of the screen can also be chosen automatically in dependency on a respective driving situation. Such possible subdivisions of the screen are indicated in FIGS. 1 to 5.

FIG. 1 shows the reproduction of two images, which were captured with two different cameras. A first camera is situated on the vehicle, is directed backward, and thus generates an image or a video, which can be referred to as rear view RV of the vehicle. This rear view of the vehicle is here presented full format on the screen or the display unit. Merely a smaller portion of the entire display area, e.g. less than 25 percent (the sized can be varied, though), is used for a window F. In the window F the image of a backward trailer camera, i.e. a rear view TR of the trailer, is offered.

This means that the imaging system here has at least two cameras, the first camera of which generates a first image, namely the rear view RV of the vehicle, and the second camera a second image, namely the rear view TR of trailer.

The position of the window F in the center at the top of the display area has the advantage that in this image section typically the trailer itself would be represented. The image of the trailer itself, however, is of no use for the driver so that this area is used for the rear view TR of the trailer so that the driver can see the environment behind the trailer.

FIG. 2 shows a variant of the subdivision of the screen or the display area. Here not only the images of two cameras are presented simultaneously, but the images of three cameras. Possibly the presentation of the individual images is effected entirely independently of each other.

Especially, in the embodiment variant according to FIG. 2 a rear view ML of a left exterior mirror camera and a rear view MR of a right exterior mirror camera are presented simultaneously on the left image half and the right image half. In this case the window F for the rear view TR of the trailer is situated in the center of the screen or of the entire display area. This means that the window on three sides at least partly is surrounded by the rear view ML of the left exterior mirror camera and on three sides at least partly by the rear view MR of the right exterior mirror camera. The reason for the choice of this position of the window F is that the composite images ML and MR of the two exterior mirror cameras typically represent the trailer in the center. This trailer representation in turn is of no relevance to the driver and therefore is used for the rear view TR of the trailer. Thus quasi three logical windows are generated for three images ML, MR, and TR of three employed cameras.

In the example of FIG. 3 a composition is chosen, in which the top half of the rectangular display area is used exclusively for the rear view TR of the trailer. The bottom half of the display area is divided in halves for the rear view ML of the left exterior mirror camera and the rear view MR of the right exterior mirror camera. This means that in comparison with the embodiment according to FIG. 2 the rear view TR of the trailer is represented considerably larger than the rear views ML and MR of the exterior mirror cameras. This is an advantage if the driver attaches more importance to the representation immediately behind the trailer. This can for instance be the case with large trailers, behind which a large area is to be monitored.

In the embodiment according to FIG. 4 the images of four cameras are represented simultaneously. This means four logical windows are necessary, of which in the present example one window practically represents the entire display area, of which only three small windows are cut out. Especially the rear view RV of the vehicle is quasi represented as background image on the entire screen with the exception of a small part, which is used for the other three windows. Centrally, in the middle at the top in the display area there is a trapezoid section, the top 'half' of which is used for the rear view TR of the trailer. Of the bottom "half" of the trapeze one half is used for the rear view ML of the left exterior mirror camera and the other half for the rear view MR of the right exterior mirror camera. By the simultaneous presentation of images from four cameras the combination a comprehensive overview of the rear environment of the combination is provided.

FIG. 5 shows a variation option of the embodiment of FIG. 1. Whilst the major part of the display area is used again for the rear view RV of the rear camera of the vehicle, here, too, only a small portion of the display area in the center at the top is used for the rear view TR of the trailer. With this variation of the window F for the rear view TR of the trailer it should be indicated that the window can be formed dynamically. For instance the window can be automatically adapted to the size of the trailer or the size of the image of the trailer. In particular the window can also be exactly adapted to the contour of the trailer. It is also advantageous if the position of the window changes with the position of the trailer behind the vehicle. When driving along a curve the trailer namely swings out and covers another area of the rear view RV of the vehicle rear camera. It consequently is also invariably advantageous if the portion actually covered by the trailer is used for the rear view TR from the backward trailer camera.

In FIGS. 6 and 7 various cases of application are schematically represented. The top view of FIG. 6 shows a towing vehicle C1, which pulls a trailer T. An arrow points in the direction DT. The rear views RV, TR, ML, and MR from the various cameras of the combination are indicated with lines in FIG. 6.

The vehicle C2 following the combination C1, T without the imaging system cannot be seen by the driver. This is because it is situated directly behind the trailer T. With the imaging system the following vehicle C2, however, is shown in the window F for the rear view TR of the trailer so that the driver can surely perceive it.

In the situation of FIG. 7 the combination C1, T is represented on a different lane than the following vehicle C2. This is situated approximately in the height of the rear edge of the trailer T. For an overtaking event the combination C1, T for instance has to change to the left lane, where the following vehicle C2 is already. With a representation of the rear environment of the combination C1, T for instance with one of the images according to the FIGS. 1 to 5 the driver can better estimate the distance from the following driver C1 and thus change lanes more safely. Such imaging system is particularly valuable in the case of very long trailers. Blind spots caused by the trailer are thus eliminated.

The driver or user by the reproduction of the rear environment of the combination according to the invention is given a better idea and awareness of all areas in the environment of the vehicle and the trailer, in particular when undertaking special maneuvers. In particular thus maneuvers for the driver are rendered possible, which without the system would be extremely risky and would require the assistance of other people.

The invention claimed is:

1. A method for reproducing images of backward cameras of a combination of a vehicle and a trailer, the method comprising:
   capturing a first image by a first backward camera, which is arranged on the vehicle;
   capturing a second image by a second backward camera, which is arranged on the trailer; and
   simultaneous reproduction of the first image and the second image on a display unit in the vehicle,
   wherein for the reproduction a predeterminable window of the display device is used in order to exclusively represent the second image of the second camera of the trailer while a position of the trailer is determined, and in dependency on the position of the trailer, a position of the window is fixed within the display area, and
   wherein the position of the window is configured to be dynamically changed when the position of the trailer is monitored automatically relative to the vehicle.

2. The method according to claim 1, wherein the first camera is a rear camera of the vehicle, and on the display unit in a display area adjacent to the window the first image of this rear camera is represented.

3. The method according to claim 1, wherein the first camera is a camera on the left exterior mirror of the vehicle, and on the display unit in a display area adjacent to the window the first image of this camera on the left exterior mirror is represented, and wherein a third camera is arranged on the right exterior mirror, and on the display unit in a display area adjacent to the window a third image of this third camera on the right exterior mirror is represented.

4. The method according to claim 3, wherein a fourth camera is arranged in the rear of the vehicle, and on the display unit in a display area adjacent to the window a fourth image of this fourth camera is represented.

5. The method according to claim 1, wherein a dimension of the trailer is determined, and automatically in dependency on the dimension of the trailer a contour of the window is formed.

6. An imaging system for reproducing images of a combination of a vehicle and a trailer comprising:
   a first camera, which is arrangeable on the vehicle to face towards the rear, for capturing a first image;
   a second camera, which is arrangeable on the trailer to face towards the rear, for capturing a second image; and
   a display unit for simultaneous reproducing of the first image and the second image in the vehicle,
   wherein in a display area of the display unit, a predeterminable window is provided in order to exclusively represent the second image of the second camera of the trailer while a position of the trailer is determined, and in dependency on the position of the trailer, a position of the window is fixed within the display area, and
   wherein the position of the window is configured to be dynamically changed when the position of the trailer is monitored automatically relative to the vehicle.

7. The imaging system according to claim 6, wherein in a use position of the display unit the window in the display area is arranged in the center at the top.

8. The imaging system according to claim 6, wherein in a use position of the display unit the window in the display area is arranged in the center.

9. The imaging system according to claim 6, wherein in a use position of the display unit below the window in the display area, a further window each for an image of the first camera and for an image of the third camera are arranged.

10. A vehicle comprising an imaging system according to claim 6.

* * * * *